(12) United States Patent
Abu el Ata et al.

(10) Patent No.: US 7,783,468 B2
(45) Date of Patent: Aug. 24, 2010

(54) AUTOMATED SYSTEM AND METHOD FOR SERVICE AND COST ARCHITECTURE MODELING OF ENTERPRISE SYSTEMS

(75) Inventors: Nabil A. Abu el Ata, New York, NY (US); Marc Desmichels, Suresnes (FR); Annie Drucbert, New York, NY (US); Guy Spelman, Sevenoaks (GB); Jonathan Blunt, Needham, MA (US)

(73) Assignee: Accretive Technologies, Inc., New York, NY (US)

( * ) Notice: Subject to any disclaimer, the term of this patent is extended or adjusted under 35 U.S.C. 154(b) by 1007 days.

(21) Appl. No.: 11/397,915

(22) Filed: Apr. 3, 2006

(65) Prior Publication Data

US 2006/0241931 A1  Oct. 26, 2006

Related U.S. Application Data

(63) Continuation-in-part of application No. 11/302,988, filed on Dec. 13, 2005, now abandoned, which is a continuation-in-part of application No. 09/942,096, filed on Aug. 28, 2001, now abandoned.

(60) Provisional application No. 60/228,702, filed on Aug. 29, 2000.

(51) Int. Cl.
*G06F 9/45* (2006.01)
*G06F 17/10* (2006.01)
*G06F 11/34* (2006.01)
*G06Q 10/00* (2006.01)

(52) U.S. Cl. ................................ 703/22; 703/2; 705/11; 705/348

(58) Field of Classification Search .................... 703/22, 703/2; 705/11, 348
See application file for complete search history.

(56) References Cited

U.S. PATENT DOCUMENTS 5,146,591 A    9/1992   Bachman et al.
(Continued)

OTHER PUBLICATIONS

Euroexpert—Best Practices: French Social Security—UNEDIC dated 1992 (Euroexpert hereafter)—Provided by applicant on Jul. 3, 2006.*

(Continued)

*Primary Examiner*—Kamini S Shah
*Assistant Examiner*—Akash Saxena
(74) *Attorney, Agent, or Firm*—Hamilton, Brook, Smith & Reynolds, P.C.

(57) ABSTRACT

An automated system and method is provided for system architects to model enterprise-wide architectures of information systems. From an initial model of a proposed system architecture, performance metrics are modeled and compared against a set of user-defined corporate and business requirements, including cost, quality of service and throughput. For unacceptable metrics, modifications to the system architecture are determined and proposed to the system architect. If accepted, the model of the system architecture is automatically modified and modeled again. Once the modeled performance metrics satisfy the corporate and business requirements, a detailed description of the system architecture derived from the model is output. The model of the system architecture also enables a business ephermeris or precalculated table cross referencing enterprise situation and remedy to be formed. A rules engine employs the business ephemeris and provides indications to the enterprise user for optimizing or modifying components of the enterprise system architecture.

20 Claims, 8 Drawing Sheets

U.S. PATENT DOCUMENTS

| | | | |
|---|---|---|---|
| 5,193,183 A | | 3/1993 | Bachman |
| 5,195,178 A | | 3/1993 | Krieger et al. |
| 5,208,765 A | | 5/1993 | Turnbull |
| 5,233,513 A | * | 8/1993 | Doyle ............................. 705/7 |
| 5,241,645 A | | 8/1993 | Cimral et al. |
| 5,276,877 A | | 1/1994 | Friedrich et al. |
| 5,297,279 A | | 3/1994 | Bannon et al. |
| 5,365,425 A | * | 11/1994 | Torma et al. .................... 705/2 |
| 5,402,795 A | * | 4/1995 | Reichl ........................ 600/508 |
| 5,446,874 A | | 8/1995 | Waclawsky et al. |
| 5,486,995 A | | 1/1996 | Krist et al. |
| 5,522,014 A | | 5/1996 | Clark et al. |
| 5,539,652 A | | 7/1996 | Tegethoff |
| 5,615,109 A | * | 3/1997 | Eder ............................. 705/8 |
| 5,680,590 A | | 10/1997 | Parti |
| 5,701,400 A | | 12/1997 | Amado |
| 5,724,556 A | | 3/1998 | Souder et al. |
| 5,724,569 A | | 3/1998 | Andres |
| 5,726,914 A | | 3/1998 | Janovski et al. |
| 5,729,746 A | | 3/1998 | Leonard |
| 5,771,370 A | | 6/1998 | Klein |
| 5,790,789 A | | 8/1998 | Suarez |
| 5,801,958 A | | 9/1998 | Dangelo et al. |
| 5,809,282 A | * | 9/1998 | Cooper et al. ............... 709/226 |
| 5,822,749 A | | 10/1998 | Agarwal |
| 5,881,268 A | | 3/1999 | McDonald et al. |
| 5,893,074 A | * | 4/1999 | Hughes et al. ................. 705/8 |
| 5,937,165 A | | 8/1999 | Schwaller et al. |
| 5,953,707 A | * | 9/1999 | Huang et al. ................. 705/10 |
| 5,958,009 A | | 9/1999 | Friedrich et al. |
| 5,984,511 A | | 11/1999 | Vasey-Glandon et al. |
| 5,987,552 A | * | 11/1999 | Chittor et al. ............... 710/310 |
| 5,999,734 A | | 12/1999 | Willis et al. |
| 6,003,079 A | | 12/1999 | Friedrich et al. |
| 6,009,256 A | | 12/1999 | Tseng et al. |
| 6,018,716 A | * | 1/2000 | Denardo et al. ................ 705/7 |
| 6,023,706 A | | 2/2000 | Schmuck et al. |
| RE36,602 E | | 3/2000 | Sebastian et al. |
| 6,038,540 A | | 3/2000 | Krist et al. |
| 6,055,493 A | * | 4/2000 | Ries et al. .................... 702/186 |
| 6,061,724 A | * | 5/2000 | Ries et al. .................... 709/224 |
| 6,067,412 A | | 5/2000 | Blake et al. |
| 6,115,718 A | | 9/2000 | Huberman et al. |
| 6,119,103 A | * | 9/2000 | Basch et al. ................. 705/35 |
| 6,119,125 A | | 9/2000 | Gloudeman et al. |
| 6,145,121 A | | 11/2000 | Levy et al. |
| 6,236,955 B1 | * | 5/2001 | Summers ....................... 703/6 |
| 6,272,507 B1 | | 8/2001 | Pirolli et al. |
| 6,289,382 B1 | * | 9/2001 | Bowman-Amuah ......... 709/226 |
| 6,311,144 B1 | | 10/2001 | Abu El Ata |
| 6,327,551 B1 | | 12/2001 | Peterson et al. |
| 6,345,239 B1 | * | 2/2002 | Bowman-Amuah ............ 703/6 |
| 6,370,681 B1 | | 4/2002 | Dellarocas et al. |
| 6,393,386 B1 | | 5/2002 | Zager et al. |
| 6,427,132 B1 | * | 7/2002 | Bowman-Amuah .......... 703/22 |
| 6,449,588 B1 | * | 9/2002 | Bowman-Amuah .......... 703/21 |
| 6,529,909 B1 | * | 3/2003 | Bowman-Amuah .......... 707/10 |
| 6,532,465 B2 | * | 3/2003 | Hartley et al. ................. 707/10 |
| 6,560,569 B1 | | 5/2003 | Abu El Ata |
| 6,578,068 B1 | * | 6/2003 | Bowman-Amuah ......... 709/203 |
| 6,611,867 B1 | | 8/2003 | Bowman-Amuah |
| 6,615,199 B1 | * | 9/2003 | Bowman-Amuah .......... 706/50 |
| 7,031,901 B2 | | 4/2006 | Abu El Ata |
| 7,162,427 B1 | * | 1/2007 | Myrick et al. ................. 705/1 |
| 7,200,563 B1 | * | 4/2007 | Hammitt et al. ............... 705/7 |
| 7,340,406 B1 | | 3/2008 | Tribble |
| 7,343,295 B2 | | 3/2008 | Pomerance |
| 2001/0032207 A1 | * | 10/2001 | Hartley et al. ............... 707/102 |
| 2001/0041995 A1 | * | 11/2001 | Eder ............................. 705/7 |
| 2001/0041996 A1 | * | 11/2001 | Eder ............................. 705/7 |
| 2002/0038228 A1 | * | 3/2002 | Waldorf et al. ................. 705/7 |
| 2002/0128810 A1 | * | 9/2002 | Craig et al. .................... 703/17 |
| 2002/0129329 A1 | * | 9/2002 | Nishioka et al. ............. 717/104 |
| 2003/0120361 A1 | | 6/2003 | Anderson et al. |
| 2003/0195789 A1 | * | 10/2003 | Yen ............................... 705/9 |
| 2004/0093585 A1 | * | 5/2004 | Christodoulou et al. ..... 717/104 |
| 2004/0128618 A1 | | 7/2004 | Datta |
| 2004/0138933 A1 | | 7/2004 | LaComb et al. |
| 2004/0167765 A1 | | 8/2004 | Abu El Ata |
| 2005/0021348 A1 | * | 1/2005 | Chan et al. .................... 705/1 |
| 2006/0053149 A1 | * | 3/2006 | Iwasaki et al. .............. 707/102 |
| 2006/0233105 A1 | * | 10/2006 | Rapp ........................ 370/230 |
| 2008/0004856 A1 | * | 1/2008 | Avitzur et al. ................. 703/17 |
| 2008/0294408 A1 | * | 11/2008 | Padmanabhan ............. 703/13 |
| 2009/0112668 A1 | * | 4/2009 | Abu El Ata .................... 705/7 |

OTHER PUBLICATIONS

"Euroexpert: Gate'N," Euroexpert SA, Antony, France (Sep. 1, 1997), 2 pgs.*

"Euroexpert: Best Practices: Milan Stock Exchange," Euroexpert SA, Antony, Fanece (Sep. 1007), 2 pgs.*

"Euroexpert: Best Practices: France Telecom," Euroexpert SA, Antony, France (Sep. 1, 1997), 2 pgs.*

Abu El Ata, N., "How we Avoided Murphy's Law at the Italian Stock Exchange", CMG 1997, I consisting of 7 pages.*

Sudip Bhattacharjee, R. Ramesh, "Enterprise Computing Environments and Cost Assessment," *Communications of the ACM*, 43(10):75-82 (2000).

"BMC Software BEST/1," http://www.bgs.com (Updated: Apr. 10, 1998), 1 pg.

"About BEST/1," http://www.bgs.com/bgs.htm (Printed Out: May 21, 1998) 1 pg.

"BMC Software to Acquire BGS Systems," http://www.bgs.com/bmcbgs.htm (Printed Out: May 21, 1998), 3 pgs.

"Performance and Capacity Management, BEST/1—Visualizer for AS/400," http://www.bgs.com/as400/as4_home.htm (Printed: May 21, 1998), 2 pgs.

"BEST/1—Visualizer for AS/400, Product Description," http://www.bgs.com/as400/Slid_2.html (Printed Out: May 21, 1998), 2 pgs.

"BEST/1—Visualizer for AS/400, Bottleneck Detection and Analysis," http://www.bgs.com/as400/Slid_3.html (Updated: Nov. 22, 1996), 2 pgs.

"BEST/1—Visualizer for AS/400, Threshold Exception Reporting," http://www.bgs.com/as400/Slid_4.html (Updated: Jan. 23, 1997), 2 pgs.

"BEST/1—Visualizer for AS/400, Track and Trend Long-term Performance," http://www.bgs.com/as400/Slid_6.html (Printed Out: May 21, 1998) 2 pgs.

"BEST/1—Visualizer for AS/400, CPU/System Graphs," http://www.bgs.com/as400/Slid_8.html (Updated: Nov. 29, 1996, 2 pgs.

"BEST/1—Visualizer for AS/400, I/O Subsystem Graphs," http://www.bgs.com/as400/Slid_9.html (Updated: Nov. 30, 1996), 2 pgs.

"BEST/1—Visualizer for AS/400, Storage Pool Graphs," http://www.bgs.com/as400/Slid_11.html (Updated: Nov. 22, 1996), 2 pgs.

"BEST/1—Visualizer for AS/400, Communication Line Graphs," http://www.bgs.com/as400/Slid_12.html (Updated: Nov. 30, 1996), 2 pgs.

"BEST/1—Visualizer for AZ/400, Job Graphs," http://www.bgs.com/as400/Slid_13.html (Updated: Jan. 22, 1997) 2 pgs.

"The Portable Simulation Initiative and the Common Modeling Framework," http://www.ses.com/psi-cmf.html (Updated: Apr. 3, 1998), 3 pgs.

"SES—Products and Services: Why Simulate?" http://www.ses.com/whysimulate.html (Updated: Apr. 2, 1998), 7 pp. from *Capacity Management Review*, vol. 36, No. 2, Feb. 1998.

"SES in the Press," http://www.ses.com/news/html (Updated: Apr. 8, 1998), 3 pgs.

"SES Inc. Announces Release of Strategizer," http://www.ses.com/pr_archive/010297.html (Updated: Jul. 14, 1997, 2 pgs.

"SES Releases SES/Workbench 3.1," http://www.ses.com/pr_archive/022896.html (Updated Jul. 14, 1997), 3 pgs.

"SES/workbench: Workbench Overview," http://www.ses.com/workbench.html (Updated: Feb. 10, 1998), 3 pgs.

"SES/objectbench: Batch Execution," http://www.ses.com/Objectbench/sim_details_batch.html (Updated: Apr. 6, 1998), 2 pgs.

"SES/objectbench: The Objectbench Animated Simulator," http://www.ses.com/Objectbench/simulator.html (Updated: Apr. 15, 1998), 2 pgs.

"SES/objectbench," http://www.ses.com/Objectbench/index.html (Updated Apr. 6, 1998), 2 pgs.

EETimes: Intel, Others Eye Performance Modeling Standard, http://www.techweb.com/se/directlink.cgi?EET19971103S0105 (Nov. 3, 1997), 2 pgs.

"Euroexpert: GATE™ , " Euroexpert SA, Antony, France (Sep. 1, 1997), 2 pgs.

"Euroexpert: Best Practices: Milan Stock Exchange," Euroexpert SA, Antony, Fanece (Sep. 1, 1007), 2 pgs.

"Euroexpert: Best Practices: France Telecom," Euroexpert SA, Antony, France (Sep. 1, 1997), 2 pgs.

"Simulation modeling within workflow technology," Miller, et al., Proceedings of the 1995 Winter Simulation Conference, Dec. 3-6, 1995.

"Analyzing and re-engineering business process using simulation," Bhskar, et al., Proceeding of the 1994 Winter Simulation Conference, Dec. 11-14, 1994.

"BEST/1—Visualizer for AS/400, Workload Analysis," http://www.bgs.com/as400/Slid_5.html (Updated: Jan. 23, 1997), 2 pgs.

Gunther, N., "The Practical Performance Analyst", *Performance-by-Design Techniques for Distributed Systems*, McGraw-Hill, Table of Contents only consisting of 9 pages, 1998.

"Model Driver Architecture (MDA) Document No. ormsc/2001-07-01", Architecture Board ORMSC[1], pp. 1-31, Jul. 2001.

Grady, R., et al., "Software Metrics: Establishing A Company-Wide Program", Prentice-Hall, Inc., Table of Contents only, consisting of 5 pgs., 1987.

Jacobson, I., et al., "Software Reuse", *Architecture Process and Organization for Business Success*, ACM Press, Table of Contents only, consisting of 9 pages, Addison-Wesley, 1997.

Bontempo, et al., "Data Management Principles and Products", Prentice Hall, Inc., 1995, Table of Contents only consisting of 10 pages.

Booch, G., et al., "The Unified Modeling Language User Guide", Addison Wesley Longman, Inc. 1999, Table of Contents only, consisting of 9 pages.

Rechtin, E., "System Architecting", *Creating and Building Complex Systems*, Prentice Hall, 1991, Table of Contents only, consisting of 5 pages.

Humphrey, W., "Managing the Software Process", SEI Series in Software Engineering, Addison-Wesley, 1990, Table of Contents only, consisting of 7 pages.

Boehm, B., "Software Engineering Economics", Prentice Hall, 1981, Table of Contents only, consisting of 14 pages.

Bass, L., et al., "Software Architecture in Practice", SEI Series in Software Engineering, Addison-Wesley, 1998, Table of Contents only, consisting of 8 pages.

Soley, R., et al., "Model Driven Architecture" *Object Management Group*, pp. 1-12 (Nov. 27, 2000).

Hutchins, G., "ISO 9000, A Comprehensive Guide to Registration, Audit Guidelines, and Successful Certification" (Oliver Wight Publications, Inc.) 1993, Table of Contents Only consisting of 5 pages.

Lazowska, E., et al., "Quantitative System Performance: *Computer System Analysis Using Queueing Network Models*", Prentice-Hall, Inc., 1984, Table of Contents Only consisting of 8 pages.

Beck, K., "Extreme Programming Explained", Addison-Wesley 2000, Table of Contents Only consisting of 7 pages.

Sarris, D., et al., "The White Papers: *Capacity Planning for e-Commerce Systems With Benchmark Factory*™", http://www.quest.com/whitepapers/cap_plan_Ecomm.pdf. pp. 1-19. No date given.

Leymann, F., et al, "Production workflow: concepts and techniques", 2000, Table of Contents Only consisting of 14 pages.

"Pyramid: Quantitative management: get a grip on software!" 100 pages, 1991.

Shaw, M., et al., "Software Architecture: *Perspectives on an Emerging Discipline*", Prentice Hall 1996, Table of Contents only consisting of 7 pages.

"EuroExpert GATE™ Model Product Description: *A predictive approach to efficient information systems*", pp. 1-21, 1994.

Ata, N., "How we Avoided Murphy's Law at the Italian Stock Exchange", CMG 1997, consisting of 7 pages.

Ata, N., "How Metrics and Models Made Architecture Real," presented at DCI Conference in Washington, D.C. in Feb. 2000 (slides 1-21).

Ata, N., "A Predictive Modeling Approach to Developing Complex Systems," presented at CSC Leading Edge Forum Conference on Mar. 6, 2001 (slides 1-35).

Menasce, D., et al., "Capacity Planning and Performance Modeling", 1994, Prentice-Hall, ISBN 0-13-035494-5.

Agrawal, S., et al., "The aggregate server method for analyzing serialization delays in computer systems", ACM Transactions on Computer Systems, vol. 1, Issue 2, pp. 116-143, May 1983, ISSN: 0734-2071.

Compaq Open VMS Documentation, "TCP/IP Networking on Open VMS Systems", Nov. 1996, URL: http://www.openvms.compaq.com:8000/ssb71/6436p.htm.

Altmann, M., "A list of software for computer simulations", Last updated, Nov. 11, 1996. URL: http://www.nmsr.labmed.umn.edu/~michael/dbase/outgoing/FAQ.html.

Keshav, S., "Real 5.0 Overview", Aug. 13, 1997, URL: http://www.cs.cornell.edu/skeshav/real/overview.html.

Keshav, S., "Real 5.0 User Manuel", Aug. 13, 1997, URL: http://www.cs.cornell.edu/skeshav/real/user.html.

Keshav, S., "Real 5.0 Programmer's Manual", Aug. 13, 1997, URL: http://www.cs.cornell.edu/skeshav/real/prog.html.

Keshav, S., "Real 5.0 Changes", Aug. 13, 1997, URL: http://www.cs.cornell.edu/skeshav/real/changes.html.

Keshav, S., "Real 4.0 Programmer's Manual", Oct. 21, 1993, URL: http://minnie.cs.adfa.oz.au/REAL/prog.asc.gz.

Keshav, S., "Real 4.0 User's Manual", Oct. 21, 1993, URL: http://minnie.cs.adfa.oz.au/Real/user.asc.gz.

Eureka Project E!636. URL: http://www3.eureka.be/Home/projectdb/PrjFormFrame.asp?pr_id=636.

Choukri, T., "cv_choukri.htm", 1999. URL: http://www.global-coms.com/consultants/cv_choukri.htm.

US. Trademark Electronic Search System, search result for Trademark Serial No. 74555204. Nov. 27, 2001.

Ata, N., "A Predictive Modeling Approach to Developing Complex Systems", CSC Leading Edge Forum, Mar. 6, 2001, URL: http://www2.csc.com/lef/programs/forum/mar_01.htm.

Ata, N., "System Performance Modeling", ITC Meeting Minutes, Dec. 2, 1999, URL: http://www.istis.unomaha.edu/itc/meetings/m991202.htm.

Ata, N., "CMG97 Session Descriptions by Subject Area", CMG97 Orlando, The Computer Measurement Group's 1997 Int'l Conference, Dec. 7-12, 1997, URL: http://www.cmg.org/cmg97/cmg297sessions.html and http://www.cmg.org/cmg97/97Workload.pdf.

Rolia, J.A. and K.C. Sevcik, "The Method of Layers," *IEEE Transactions on Software Engineering 21*(8) :689-700, Aug. 1995).

White, R.V., "An Introduction to Six Sigma with a Design Example," *Applied Power Electronics Conference and Exposition*, 1992. *Conference Proceedings 1992, Seventh Annual*, Feb. 23-27, 1992, pp. 28-35.

"Euroexpert—Best Practices: French Social Security—UNEDIC", http://www.accretivetechnologies.com/documents/UNEDIC,PDF, Euroexpert and GATE (TM), 1992 Best Practices.

"Reengineering," from Wikipedia, the free encyclopedia, http://en.wikipedia.org/wiki/Reeingineering, downloaded Jan. 8, 2006, 2 pp.

Accretive/BT/Reuters, "Reuters, BT and Accretive Technologies Collaboration for Success," 2005, 1 p.

Chappell, D., "SOA: Is everyone talking the same language?", IBS Publishing, Nov. 2005, 7 pp.

\* cited by examiner

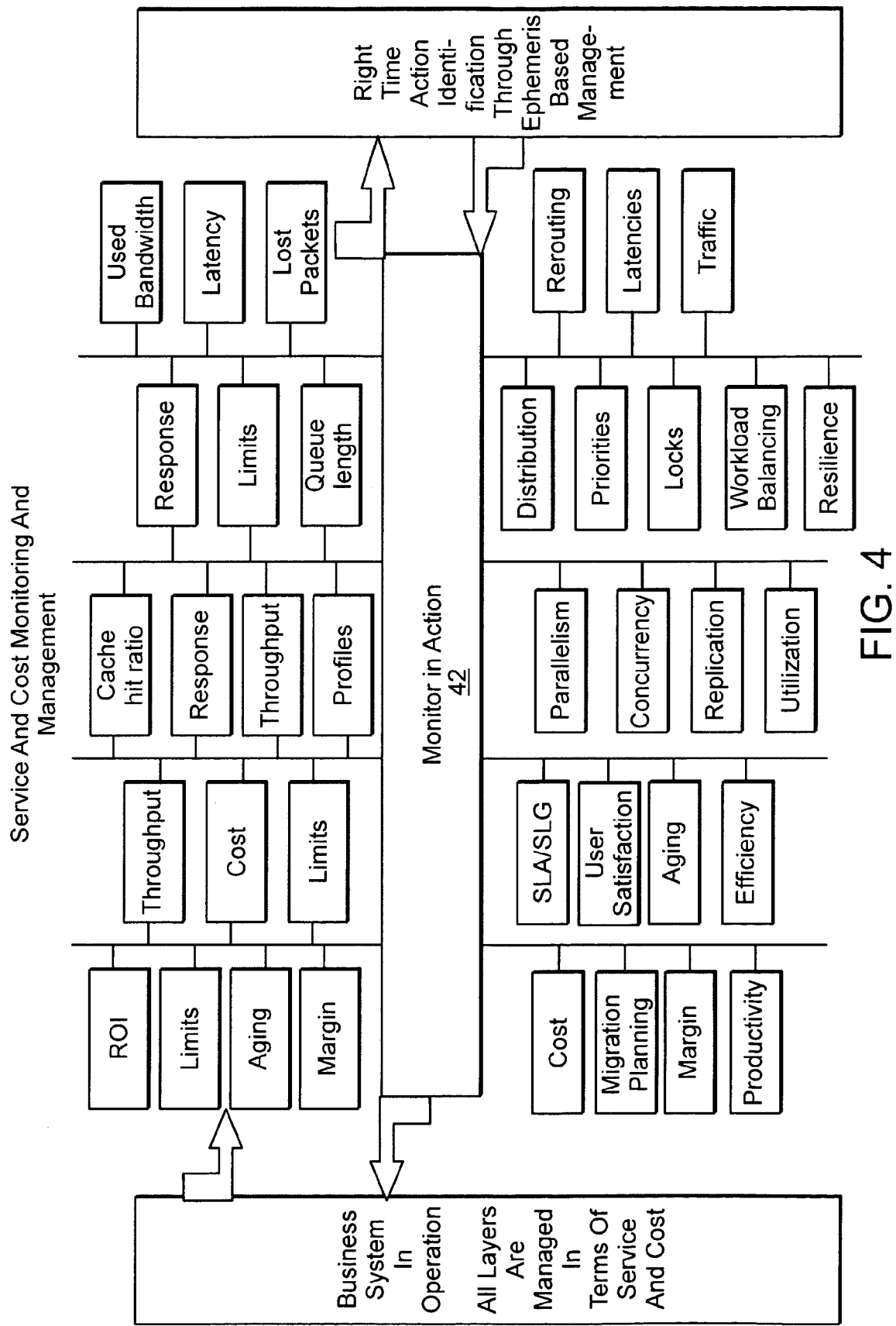

(1) Number of delivered Business Events (Particular and Global) Per Second
(2) Vector of Resource and Support consumption for a Business Event (Particular and Global)
(3) Required Response (or time window) to deliver a Business Event (Particular and Global)

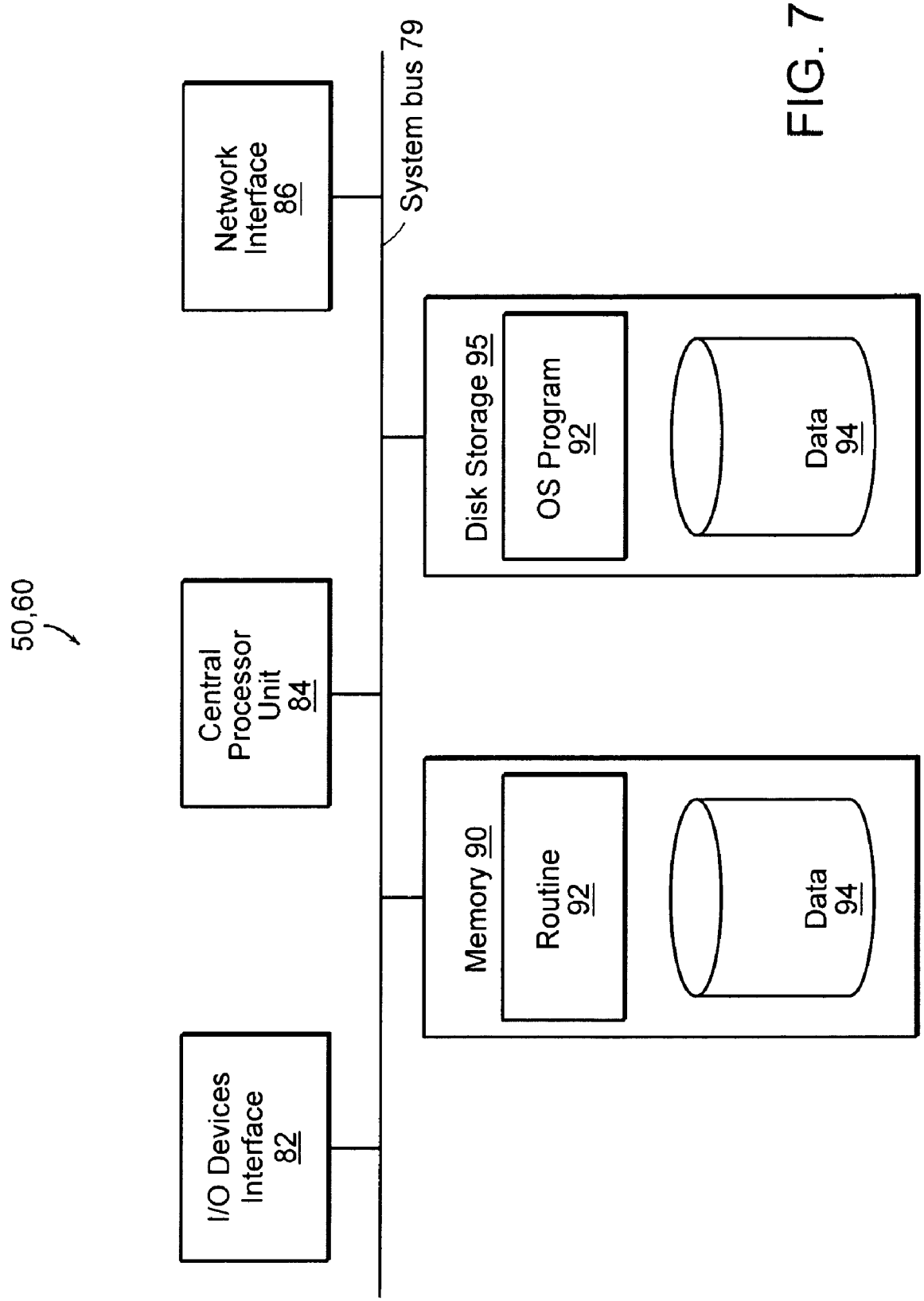

AUTOMATED SYSTEM AND METHOD FOR SERVICE AND COST ARCHITECTURE MODELING OF ENTERPRISE SYSTEMS

RELATED APPLICATIONS

This application is a Continuation-in-Part of U.S. application Ser. No. 11/302,988 filed Dec. 13, 2005 now abandoned which is a Continuation-in-Part of U.S. application Ser. No. 09/942,096, filed on Aug. 28, 2001 now abandoned which claims the benefit of U.S. Provisional Application Ser. No. 60/228,702, filed on Aug. 29, 2000 and which claims priority to (i) application Ser. No. 09/606,869, filed Jun. 29, 2000 (now U.S. Pat. No. 6,990,437), which claims the benefit of U.S. Provisional Application Ser. No. 60/142,313, filed on Jul. 2, 1999, and further claims priority to (ii) application Ser. No. 09/127,191, filed Jul. 31, 1998 (now U.S. Pat. No. 6,311,144) which claims the benefit of U.S. Provisional Application No. 60/085,350, filed on May 13, 1998. The parent application also claims priority to U.S. application Ser. No. 10/005,481, filed on Oct. 26, 2001 (now allowed) and U.S. application Ser. No. 10/014,317 filed on Oct. 26, 2001 (now allowed).

The entire teachings of all the above applications are incorporated herein by reference.

BACKGROUND OF THE INVENTION

In a business entity or organization, information is communicated, stored and shared across various channels and means. Generally, the hardware and software components involved in the tracking, processing and recording of such business information is referred to as the information system. The structure and interdependence/interaction of supporting equipment and applications components (hardware and/or software), policies and protocol forming the information system is referred to as "the information system (IS) architecture".

With the advent of electronic computing, business organizations, such as financial institutions, have utilized information systems to provide a computerized infrastructure for supporting business processes. Here the information system includes a number of interconnected hardware and software components, implementing one or more business solutions. The architectures of such systems are typically required to handle varying degrees of workload and priorities under imposed business constraints.

The design of information system architectures having such requirements and constraints represents a real challenge. Most existing methodologies, tools and techniques concentrate on static, partial descriptions of computerized business infrastructures. Dynamic system behavior is generally unknown until the information system is in construction or in operation, thus, limiting the possibilities for improvement. Unacceptable performance issues may become exacerbated as a system evolves with the addition of new business applications that must be supported by the architecture.

Furthermore, when the origin of a problem resides in questionable decisions made early in the development process, the cost of improvement could become prohibitive when a redesign of the system architecture is required at some level. Thus, a tremendous amount of investment may be lost due to the design of unacceptable system architectures.

Design and maintenance of information system architecture becomes more complex with the incorporation of enterprise management. Enterprise management includes end to end control across a corporation type entity, with plural business units, and monitoring performance in terms of enterprise (corporation wide) response or throughput, costs and quality of service.

SUMMARY OF THE INVENTION

Embodiments of the invention provide an automated system and method for defining and analyzing enterprise architectures. In particular, the present invention models service architectures and cost architectures of enterprise information systems. Embodiments provide a business process design, which describes a number of business processes and defines a set of corporate (enterprise) requirements and business service requirements for each business process. A multi-layer mathematical model of an IS architecture is constructed from the business process design and has a business layer, an application/data layer, and a technology layer. Once the initial model is constructed, performance metrics (especially cost, quality of service or class of service and throughput) are modeled at each layer and incorporated into the whole with subsequent perturbation factors.

From the modeled performance metrics, the present invention produces a business ephemeris (a precalculated table with specific data structure and content cross referencing situation and remedy) for on line (real time) and off line analysis of the subject enterprise. Preferably the business ephemeris/predetermined table is in terms of cost versus (with respect to) quality of service versus throughput. Given a current state ("situation") of the enterprise information system architecture, the table provides an indication of remedies predefined by the mathematical model, that is modifications, corrections and/or optimizations to the IS architecture to achieve target performance and meet enterprise requirements.

For each business process, the modeled performance metrics are compared with a set of corporate and business service requirements, producing respective indications of unacceptable performance metrics of one or more business processes. For business processes having unacceptable performance metrics, modifications to the enterprise IS architecture are determined and proposed to the system architect for acceptance. If accepted, the model of the IS architecture is modified with the accepted modifications and the performance metrics are updated at each layer. If the updated performance metrics satisfy the corporate and business service requirements, an output of a description of the resulting IS architecture is available.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a block diagram of a monitor feature in the embodiment of FIG. 1

FIG. 7 is a block diagram of a computer system (digital processing system) in which embodiments of the present invention are implemented in hardware, software and/or a combination thereof.

DETAILED DESCRIPTION OF THE INVENTION

A description of preferred embodiments of the invention follows.

Embodiments of the invention provide an automated system and method for enterprise management to define and analyze IS architectures of the enterprise. In particular, the present invention provides for enterprise managers a tool for modeling and analyzing cost, quality of service and throughput of information system architecture in existence or in construction (being designed).

Figure 1:
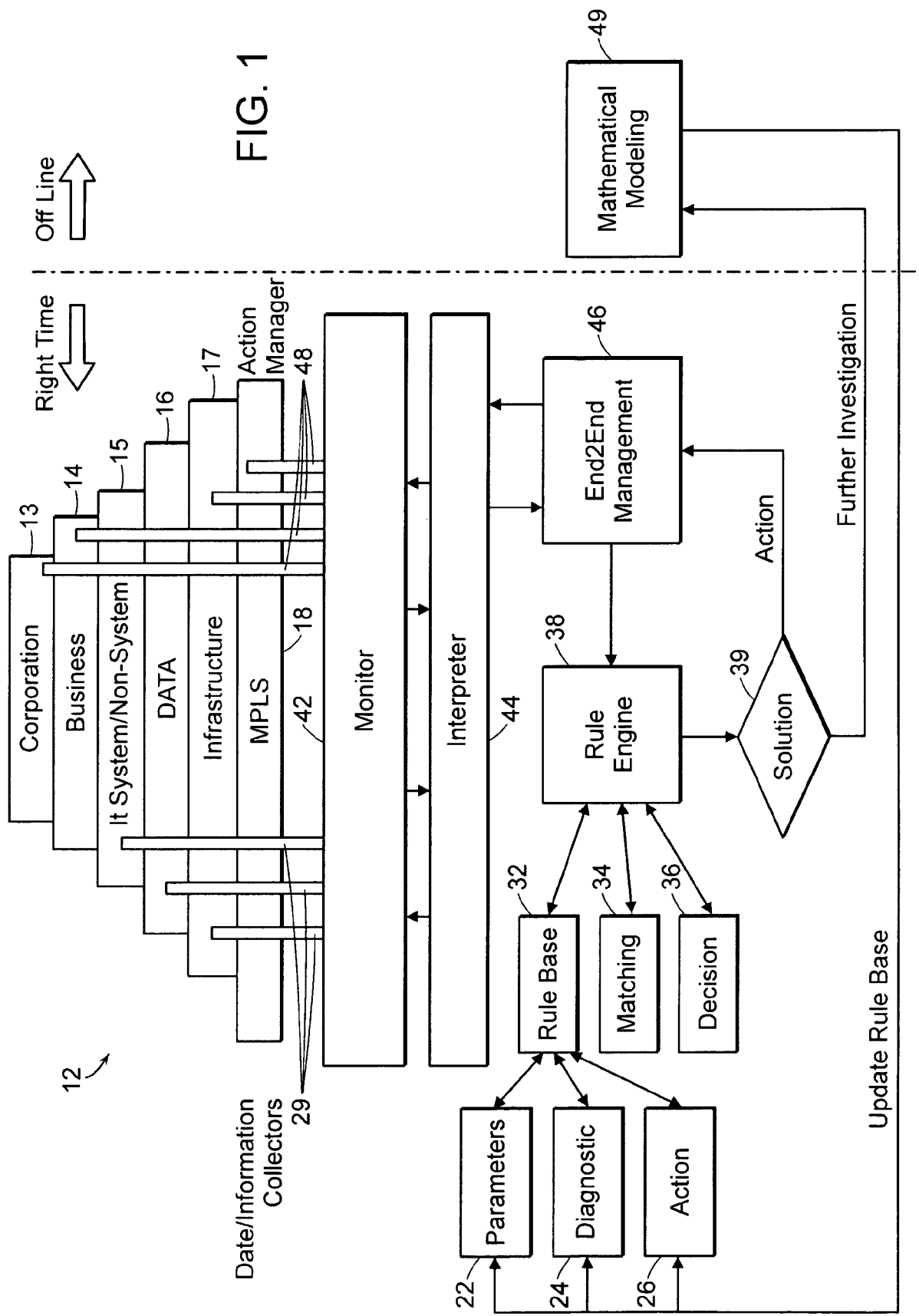
FIG. 1 is a schematic view of an embodiment of the present invention including a model based architecture assembly.

Illustrated in FIG. 1 is an embodiment of the present invention. An assembly 12 models the information system (IS) and IS architecture of a subject enterprise. Preferably assembly 12 is generated by a model-based architecture system of U.S. Pat. No. 6,311,144 (herein incorporated by reference) which has been extended from a single business unit to apply to an enterprise with multiple business units. This extension is accomplished by a corporate layer 13.

In particular, the assembly 12 models the IS architecture of a subject enterprise at different levels of abstraction beginning with a corporate layer (e.g., enterprise level) 13. The corporate layer 13 defines enterprise practices (e.g., financial practices/targets), constraints (limits on operations cost) and parameters. The corporate layer 13 also describes the strategic objectives of the enterprise including service and quality requirements. The corporate layer 13 feeds these definitions and requirements to a business layer 14.

In response, the business layer 14 defines the different business processes of the organization, the content of each process (e.g., subprocesses and functions), the intercommunication among processes (and subprocesses and functions) and their interdependencies. Performance criteria and service and cost criteria as dictated or otherwise influenced by corporate layer 13 are also defined. The business layer 14 definitions and criteria are technology independent and are passed to an application architecture layer (or IT and non-IT system layer) 15.

The IT/non-IT system layer 15 translates the corporate and business functions and practices (of corporate layer 13 and business layer 14) into computer application software solutions and other components (including non-IT system ones). Layer 15 also translates the corporate and business layers 13, 14 quality and performance criteria into quantitative requirements and quantitative indicators. There is a many-to-many correspondence between business processes of layer 14 and application or other components (IT and non-IT systems) of layer 15. Application (IT and non-IT) architecture layer 15 effectively outputs to the next layer 16 a blueprint on how the computer application architecture is distributed vertically (application layers such as presentation layer, management, logic, data and associated communication) as well as horizontally (cycles corresponding to back office activity, mid and front office, client access, etc.)

Data and technical architecture layer 16 translates the high level definitions (logical structures and performance criteria) produced by corporate layer 13, business layer 14 and application architecture layer 15 into physical definitions and implementation constraints. That is, layer 16 identifies the physical requirements (processing speed, memory, storage, infrastructure services, etc.) to achieve and support the business processes and corresponding application/software components. Layer 16 describes in detail data and information structures including metadata, storage, retrieval and security. Layer 16 also defines transaction rate, memory capacity and speed, processing speed and similar physical requirements. Interfaces, monitoring and data management alternatives are also determined, modeled and prototyped here. Although this layer 16 is technology dependent, the considerations involved in layer 16 are not platform dependent, i.e., determinations at this layer are made without regard to or independent of platform.

The infrastructure architecture layer 17 is the technology or platform specific layer. The definitions and requirements produced in the preceding layers 13, 14, 15, 16 are implemented by layer 17. In particular, layer 17 determines platform specific hardware and network components, implementation language(s), program applications and techniques and standards (e.g., for communication, signal transmission, circuits, routing mechanisms, etc.) to carry out the architecture direction. In one embodiment, this may be an IP network or MPLS (multi-protocol label switching) network.

Mathematical models are defined and utilized at each layer 13, 14, 15, 16, 17, and performance metrics are determined for constructing the IS architecture. The construction of mathematical models and determination of performance metrics preferably follows the techniques described in U.S. Pat. No. 6,990,437 (herein incorporated by reference). The multilayer mathematical modeling and IS architecture optimization is represented at (includes) MPLS layer 18 in FIG. 1. In some embodiments, the multilayer mathematical model of the enterprise IS architecture has a business layer, an application/data layer and a technology layer.

In practice, assembly 12 models the IS architecture of the subject enterprise and in particular for each layer of the multilayer mathematical model, provides cost modeling (a cost architecture model) and quality of service modeling (a service architecture model). This is preferably accomplished as illustrated in FIGS. 2 and 3.

Figure 2:
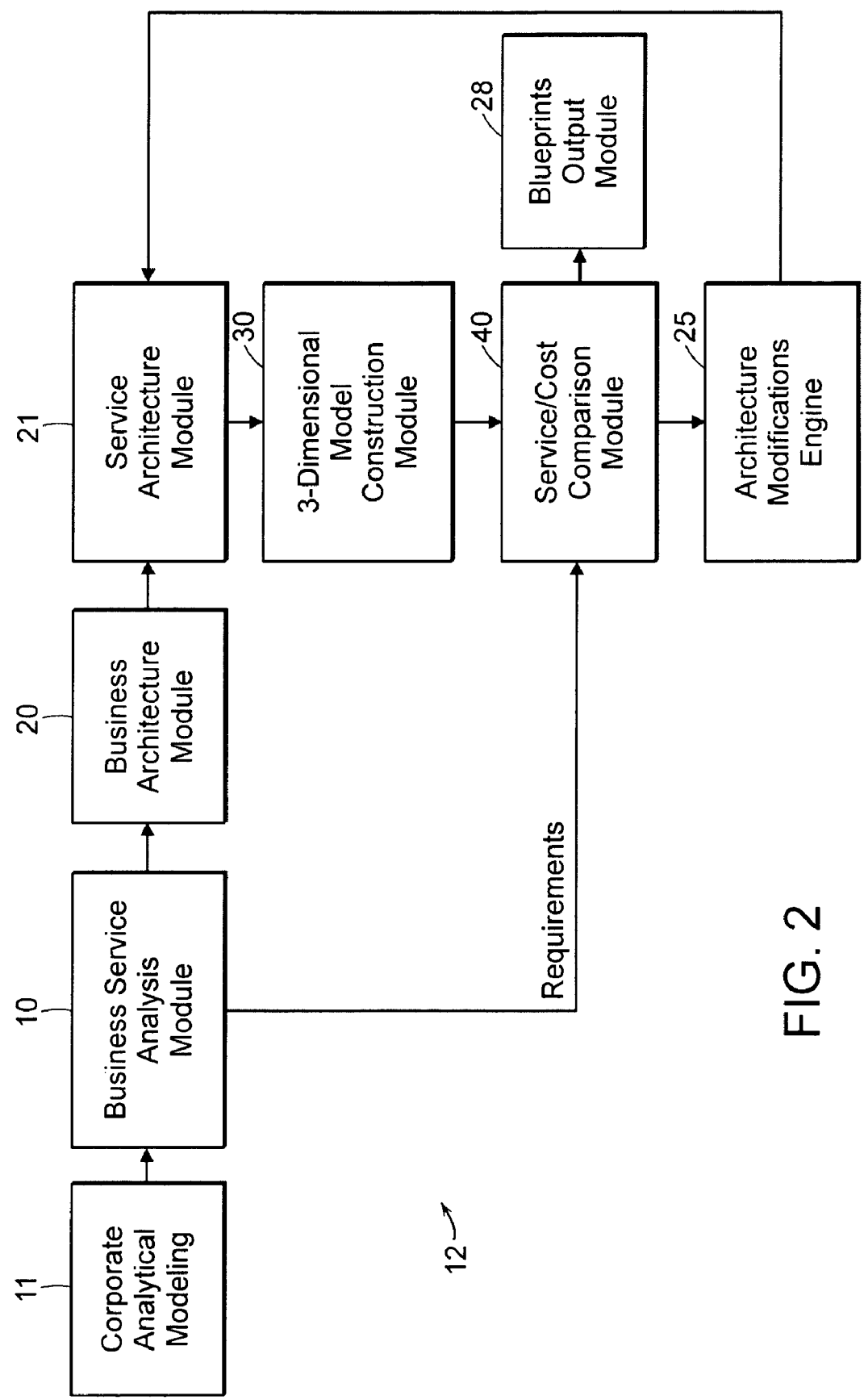
FIG. 2 illustrates the functional stages and modules of the model based architecture assembly of FIG. 1.

With reference to FIG. 2, a corporate analytical modeling stage 11 provides a graphical layout interface through which a system architect inputs or otherwise provides details and parameters of corporate plans, financial practices and targets, and service and quality requirements.

The business service analysis module 10 provides a graphical layout interface, through which the system architect inputs a business process design. A business process design identifies business processes within a business organization and the flow of communication and workload among them. Furthermore, the business process design defines a set of business requirements (including business service requirements) for each individual business process.

A business architecture stage or module 20 provides a graphical user interface through which the system architect constructs a multi-layer mathematical model of an enterprise IS architecture. The IS architecture has a business architecture which supports the business process design that was input at business service analysis module 10. Likewise at a service architecture module 21, the system architect constructs a respective multi-layer mathematical model that supports the enterprise description (plans and practices) input at the corporate modeling stage 11. In particular, service architecture module 21 defines contractual, operational, service and cost constraints (i.e., service and cost architectures) of the respective multi-layer mathematical model and applicants refer to this as the enterprise dynamic model.

Preferably, the structure of the above multi-layer mathematical models are as described in U.S. patent application Ser. No. 09/127,191 (now U.S. Pat. No. 6,311,144) entitled "Method and Apparatus for Designing and Analyzing Information Systems Using Multi-Layer Mathematical Models," filed Jul. 31, 1998, the entire contents of which are incorporated herein by reference.

The model construction module 30 combines the business architecture of business architecture stage 20, the service architecture of module 21 and the cost architecture of module 21 to form a three dimensional enterprise management model. Construction module 30 also calculates performance metrics for each component and determines interdependencies. The results of construction module 30 is a three dimensional (e.g., business, cost and service) model of the IS architecture of the subject enterprise. Thus each of the multi-layers of the mathematical model of the IS architecture has these three dimensions.

The comparison module 40 compares the modeled performance metrics output by construction module 30 with the defined set of enterprise requirements and business requirements provided at corporate analytical modeling stage 11 and business design module 10. In particular, comparison module 40 compares the calculated performance metrics for the service architecture and cost architecture to the enterprise requirements and the business service requirements. The comparison module 40 produces indications of whether one or more enterprise practices or business processes exhibit unacceptable performance metrics that do not satisfy the respective input enterprise requirements or business service requirements.

If unacceptable modeled enterprise and/or business performance metrics are identified, a rule-based modification engine 25 determines appropriate improvement inducing modifications to the three dimensional (e.g., throughput, service, cost), multi-layer model of the enterprise IS architecture. The modification engine 25 displays and proposes the modifications to the system architect for acceptance.

If accepted, the service architecture module 21 automatically incorporates the proposed modifications into the three dimensional multi-layer model of the enterprise IS architecture without further assistance from the system architect. The performance metrics for the modified IS architecture are updated by the construction module 30 and compared again by the comparison module 40. If the modeled performance metrics of the cost architecture and that of the service architecture do satisfy the enterprise requirements and the business service requirements, an output module 28 provides a detailed description of the enterprise IS architecture to the system architect for use in subsequent implementation stages. Otherwise, assembly 12 continues to iterate through the modification, modeling, and comparison stages of modules 25, 21, 30, and 40. This process continues until either (i) the modeled performance metrics of the cost architecture and the service architecture of each business process satisfy the enterprise and business service requirements or (ii) the performance metrics of the supporting hardware and software component models cannot be improved further without a change to the enterprise practices/plans and/or the business process design.

Figure 3A:
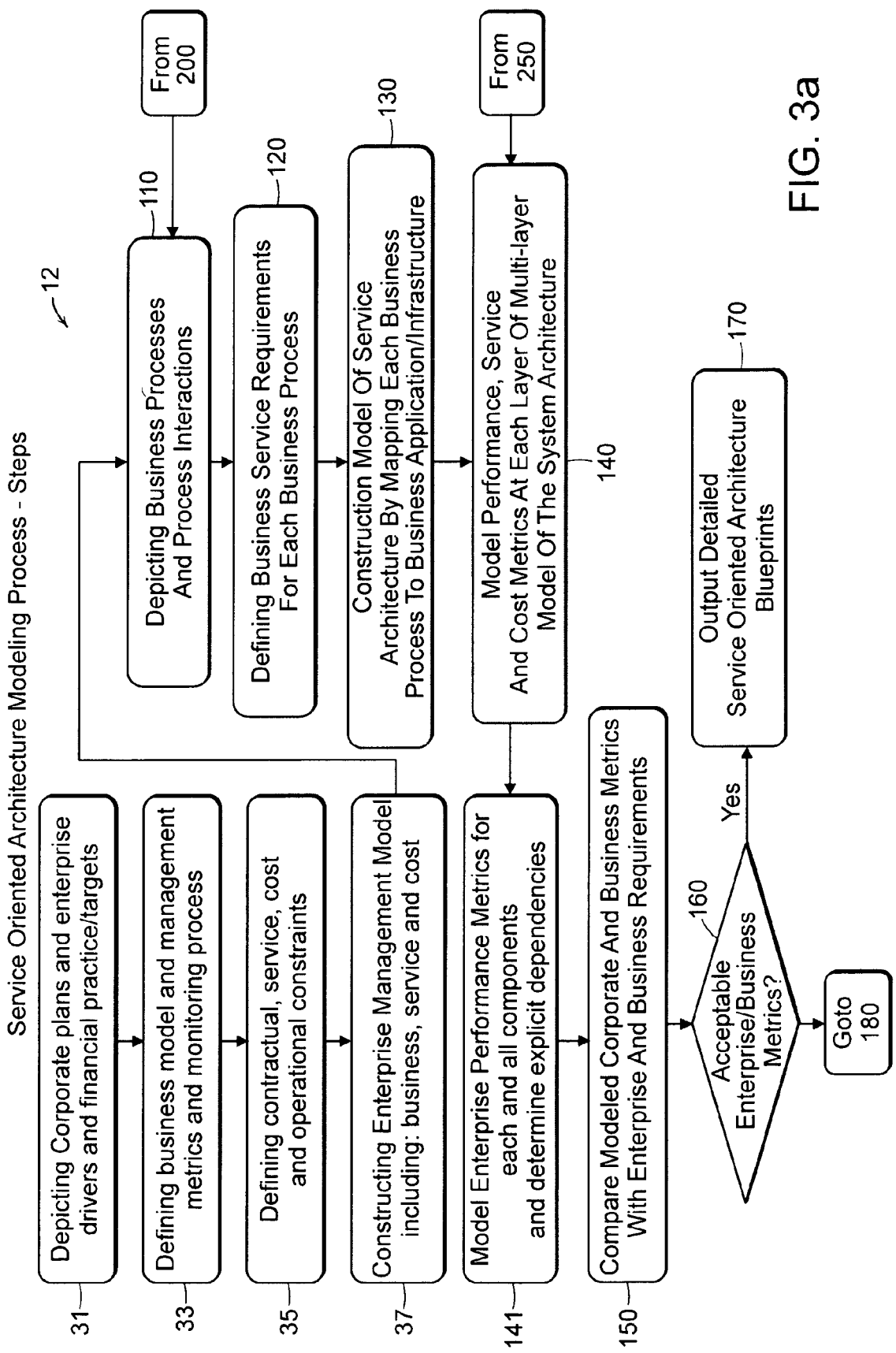
FIGS. 3A and 3B are flow diagrams of the model based architecture assembly of FIG. 1 generating a service architecture model of a subject enterprise.
Figure 3B:
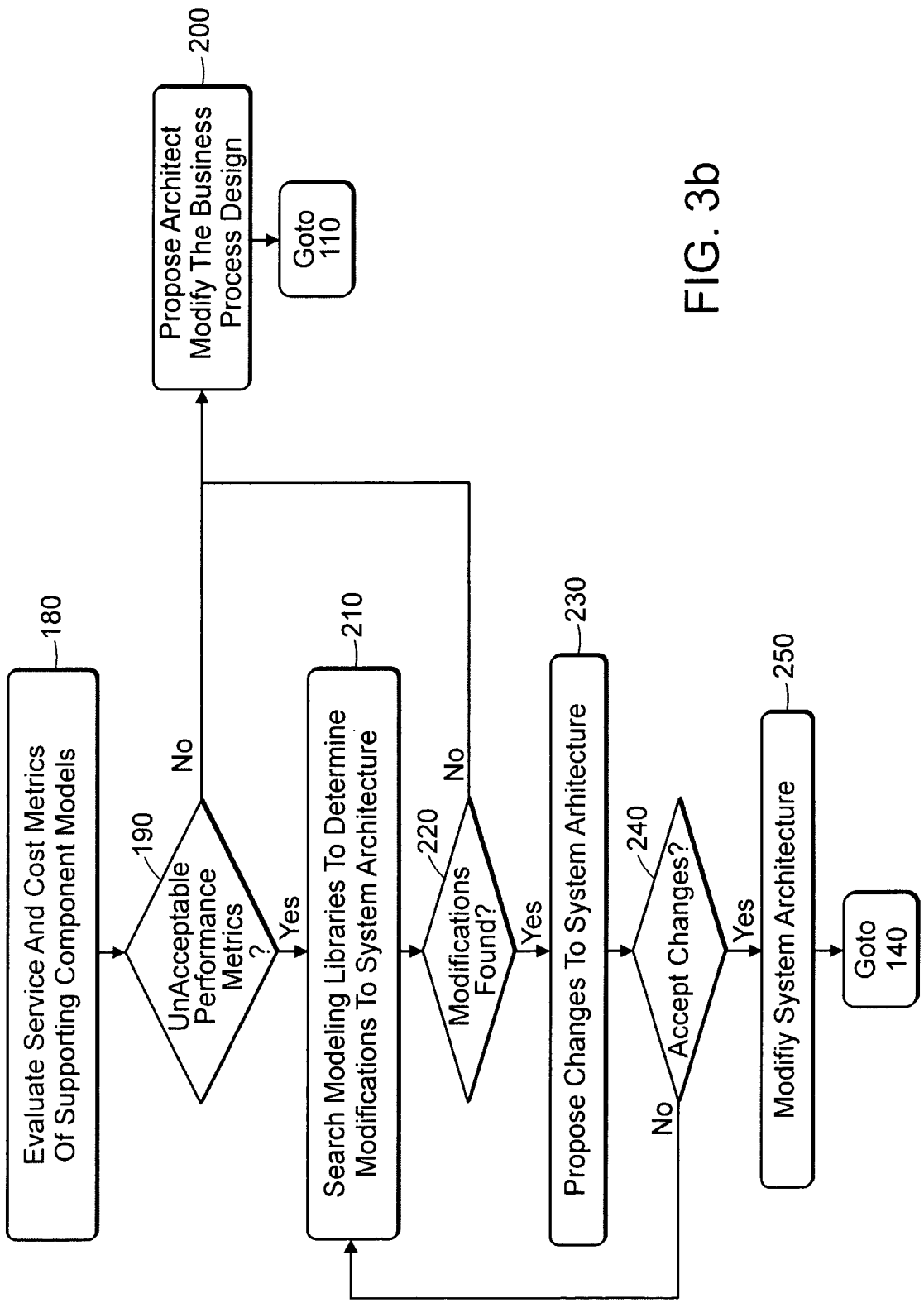

FIGS. 3A and 3B provide a flow diagram illustrating the operations of FIG. 2 in more particular detail.

At step 31, assembly 12 obtains from the system architect (user) details and parameters of corporate plans and targets as described above at corporate analytical modeling stage 11. In response, step 31 generates a depiction of corporate plans and enterprise financial practices and targets.

At step 33, assembly 12 defines the business model, management metrics and monitoring process. This is accomplished based on user input at the business service analysis module 10 and business architecture module 20.

Step 35 of FIG. 3A defines contractual service, cost and operational constraints based on user input at the service architecture module 21.

Step 37 constructs the three dimensional (business, service and cost) enterprise model of model construction module 30. In one embodiment, step 37 combines the business architecture, service architecture and cost architecture parameters and definitions from steps 31, 33 and 35 into a full enterprise dynamic model. Further data toward defining the enterprise IS architecture (three dimensional multi-layer model) is obtained through an interactive interface.

For example, at step 110, the business service analysis module 10 provides a graphical layout interface through which a system architect provides various information regarding business processes and the flow of process interactions of the subject enterprise. According to one embodiment, the graphical layout interface is implemented with a graphical scripting language, such as Universal Modeling Language (UML) or a hierarchy of graphical representations.

At step 120, the business service analysis module 10 provides a graphical layout interface through which the system architect defines the business service requirements for each business process. According to one embodiment, the business service requirements define business constraints and business drivers. Business drivers, in general, represent the workload that a business process is expected to receive. Typical business drivers include the expected number and kind of business events and the rate at which the events are received.

Business constraints refer to time and volume constraints imposed by the business needs. Typical time constraints include business response time, while typical volume constraints include events processed per day or events processed per second or events to be processed by a certain date or events that impose a certain definiteness on other events, for example. The business constraints provide a standard of comparison for determining whether the proposed system architecture meets the needs of the business unit.

At step 130, the business architecture module 20 provides a graphical user interface through which a system architect maps each business process to a business application or infrastructure. According to one embodiment, step 130 generates and displays to the system architect a list of premodeled business applications. Each listed business application is coupled to a default set of supporting hardware and software component models. The initial model is constructed by simply mapping the available business applications to corresponding business processes defined in the business process design. Thus, the system architect is relieved from defining all of supporting hardware and software components, further simplifying the automated process.

After mapping all of the business processes, the business architecture module 20/step 130 generates the multi-layer mathematical model of the subject enterprise IS architecture. In turn, at steps 140 and 141, the construction module 30 models performance metrics for each layer of the multi-layer mathematical model. Such metrics include service and cost (i.e., elongation, response time, volume of processed transactions, and transaction processing rates). According to one embodiment, the business drivers defined at step 120 are included in the modeling of the performance metrics. Step 141 calculates enterprise performance metrics for each component and determines explicit dependencies. The modeled performance metrics are then forwarded to the comparison module 40.

At step 150, the comparison module 40 makes an initial determination as to whether the modeled performance metrics of the enterprise practices and business processes satisfy the enterprise requirements and the business service requirements as defined in stages 10 and 11 of FIG. 2 (steps 110 and 120, FIG. 3A). According to one embodiment, the comparison is performed as the difference between the value of a modeled performance metric and the value of a corresponding business constraint, such as response time. Advance reasoning and fuzzy logic may also be used to ascertain whether a modeled performance metric satisfies a defined business constraint.

If, at step 160, the modeled performance metrics satisfy the enterprise/business service requirements of each business process, the modeled system architecture (generated at step 37) is forwarded to the output module 28 at step 170 to output a detailed description of the specifications of the model based IS architecture of the enterprise. The output module 28 formats the system architecture model (including service, cost and business dimensions at each layer) into a detailed set of "blueprints" describing the construction and implementation of the service oriented architecture. According to one embodiment, the format of the output is a Universal Modeling Language (UML) document, which can be displayed readily through an Internet browser. The UML-generated display shows the subject IS architecture containing hyperlinks between components within the business, application, and technology layers.

If, at step 160, at least one of the business processes exhibits unacceptable business performance metrics, the comparison module 40 at step 180 in FIG. 3B attempts to identify the supporting component models in the application and technology layers causing their unacceptable performance metrics. Toward that end, comparison module 40 evaluates the performance metrics of the supporting hardware and software component models linked to the one or more business processes exhibiting unacceptable performance metrics. According to one embodiment, the modeled performance metrics of the supporting component models are compared against vendor-provided or modeled benchmarks in order to determine if there are any inefficiencies associated with their operation.

If, at step 190, none of the supporting component models exhibits unacceptable modeled performance metrics, then the system architect is notified at step 200, through a graphical user interface, that the unacceptable performance metrics are caused by flaws in the business process design and/or enterprise plan. These flaws may include inefficient business process interactions or unrealistic business service requirements. The process returns to step 110 providing the system architect with the graphical layout interface of the business service analysis module 10 or service architecture module 21 to modify the business process or the service or cost architectures.

If, at step 190, one or more of the supporting component models do exhibit unacceptable performance metrics, then step 210 forwards the identity of the supporting components and the unacceptable performance metrics to the rule-based modification engine 25 to determine modifications to the subject IS architecture for improvement.

At step 210, the modification engine 25 determines modifications to the subject IS architecture to address the unacceptable performance metrics of supporting hardware and software components modeled therein. According to one embodiment, the rule-based modification engine 25 searches libraries (e.g., a logic tree implemented within a data store) using the identity of the supporting component models and their unacceptable metrics. The search results provide recommended modifications according to prior modeled results stored in tables (business ephemeris tables discussed below) 22, 24, 26 of FIG. 1. For example, if an increase in memory size is the recommended modification, the recommended size is a value obtained from previous modeled results. Such modifications may include replacement of the one or more supporting component models with alternate component models.

If, at step 220, the search is successful in finding recommended modifications to the subject IS architecture, then the modifications are proposed to the system architect through a graphical user interface for acceptance at step 230.

If, at step 240, the system architect rejects all of the proposed modifications, the logic tree is searched again at step 210 to locate alternative modifications to the subject IS architecture. If, at step 220, the search fails to find additional recommended modifications, then at step 220 the system architect is notified through a graphical user interface that the unacceptable performance metrics are caused by flaws in the enterprise plan or the business process design and the process returns to step 110 providing the system architect with the graphical layout interface of the business service analysis module 10 and/or service architecture module 21 to modify the business process design or enterprise plan components.

If, at step 240, the architect accepts one or more of the proposed modifications, the model of the IS architecture is automatically modified by the source architecture module 21 with the accepted modifications at step 250.

After modifying the IS architecture model, the process returns back to step 140 for further modeling, repeating the process until (i) the modeled performance metrics of each business process either satisfy the enterprise and business service requirements or (ii) the performance metrics of the supporting hardware and software component models cannot be improved further without a change to the enterprise practices/plans and/or the business process design.

Once the modeled performance metrics do satisfy the enterprise and business service requirements, the model of the enterprise IS architecture (i.e., a service oriented architecture) is formatted into a detailed description, which may be output from the output module 28 at step 170.

Referring back to FIG. 1, assembly 12 provides the model of an IS architecture, and in particular a model of a service oriented architecture of the subject enterprise according to the multi-layer mathematical modeling techniques of FIGS. 2 and 3A-3B. As such, assembly 12 models the quality of service, cost and throughput at each mathematical model layer (business, application, technology). From an initial model of assembly 12, triplet data points $\{s_i, c_i, T_i\}$ are formed with a respective quality of service value s, a cost value c and throughput value T, each at the same moment in time i in a layer of the mathematical model. Each triplet data point represents a state of the enterprise or more generally a "situation" of the enterprise. For each such state or situation, the model of assembly 12 can optimize or otherwise suggest modification to the IS architecture toward goal or target service, cost and/or throughput levels. Such optimization/modification poses or otherwise defines a remedy for the given state/situation.

The present invention stores these situation-remedy pairs in a lookup table. The table then serves as a business ephemeris or a precalculated table indexed and searchable by situation (e.g., quality of service value, cost value and throughput value). Thus given a situation $\{s,c,T\}$, the table provides the corresponding remedy as results of the table lookup. FIG. 1 illustrates this business ephemeris (the predefined or pre-modeled table) feature implemented as Parameters 22 (time i and layer, e.g., business, application or technology), Diagnostic (state or situation) 24 and Action (remedy) 26. Each of these members 22, 24, 26 support the rules 32 of rule engine 38. Rules 32 cover each layer of the assembly 12 model and each dimension (service, cost, throughput) of each layer.

In practice, assembly 12 models the IS architecture of the subject enterprise in real time. This is accomplished by the multi-layer mathematical modeling with cost, service and throughput dimensions at each layer described above. For each layer (business, application, technology) of the mathematical model, a monitor 42 calculates and manages service and cost levels. For example, as shown in FIG. 4, monitor member 42 detects on the business layer ROI (return on investments), limits, aging, margins, throughput, cost, cache hit ratio, response time, profiles, number of responses, queue length, used bandwidth, latency and lost packets. Monitor member 42 preferably employs collectors 29 for this purpose as shown in FIG. 1.

Monitor member 42 passes the detected information to interpreter 44. In response, interpreter 44 determines the current detected/sampled service, cost and throughput triplet $\{s_1, c_1, T_1\}$. Interpreter 44 feeds this triplet data point to a management element 46 which employs rules engine 38. In turn, based on the rules 32 discussed above, rules engine 38 produces an optimization or modification (solution 39) for management element 46 to take action with. That is, rules engine 38/rules 32 use the received triplet as an indication of state of the enterprise and look up (cross reference) through business ephemeris/precalculated situation-remedy table 22, 24, 26 a corresponding remedy (e.g., modification/optimization 39).

Management element 46 passes the solution (modification/optimization) 39 to interpreter 44 which translates the solution 39 into proposed changes at the different levels 13, 14, 15, 16, 17 of abstraction of the enterprise IS architecture. Monitor 42 is responsive to the proposed changes and implements them through action managers 48. In the example of FIG. 4, monitor 42 implements the changes as migration planning, cost, margins, and productivity, SLA/SLG (service level agreement/service level guarantee), user satisfaction, aging, efficiency, parallelism, concurrency, replication, utilization, distribution, priorities, locks, workload balancing, resilience, rerouting, latencies and traffic.

In another example, excessive response time is observed by monitor member 42 and interpreter 44. Table I shows sample solutions 39 generated by the present invention for implementation through action managers 48.

TABLE I

Solutions 39 for Observed Excessive Response Time

| Root Cause | Goal Solution (39) | Action (42, 44, 46, 48) |
|---|---|---|
| Excessive Physical I/O | Decrease Physical I/O Spread I/O | Increase cache hit ratio Reallocate data on disks |
| Insufficient CPU resource | Increase parallelism | Add more processors in application server, Redistribute workflows |
| Software limits parallelism | | Redesign application |
| Key process bottlenecked | allocate more resources | Change process priority |
| Excessive logical I/O | Reduce logical I/O | Index critical tables Redesign application |

Continuing with FIG. 1, off-line the present invention provides further system feedback for purposes of improving business ephemeris/pre-modeled table 22, 24, 26. Solutions 39 are further investigated in an off-line mathematical model 49 that determines network impact of the changes proposed by solutions 39.

Based on an enterprise architecture description that covers all layers of the assembly 12 model, the invention off-line mathematic modeling member 49 calculates the impact of each application message (solution 39) on the different components of the enterprise architecture. The mathematical modeling member 49 takes into account each protocol used in the enterprise architecture for the message impact repartition. At each level of the assembly 12 model, the off-line mathematical modeling member 49 adds resource utilization due to the protocols. At this point, the invention subsystem (mathematical model) 49 has a realistic view of the load of each enterprise architecture component.

Into passive elements, such as links, algorithms known in the art (such as analytic methods derived from perturbation theory and/or stochastic analysis) are used to determine the response time, throughput and the cost. Into active elements, such as routers, links are made between the different passages on each ingress or egress port and the different router application components or processes. The impact of the enterprise architecture load is associated to each process to reflect the real use of the component. To determine the response time, throughput and cost in such complex systems, a predictive mathematical algorithm, based on perturbation theory, gives results with a maximum 1% variation from the physical observation. Other techniques for determining throughput, cost and response time given the above are suitable.

The sequence of steps described above enables off-line mathematical model 49 to create all kinds of system architectures for the enterprise. The last realization is an MPLS model in which all the routing protocols that allow dynamic routing, the different Class of Services (CoS), fast convergence, VPN, etc. have been taken into account. This model accepts all types of enterprise architecture implementations in order to represent all types of applications running on MPLS.

The off-line mathematical model 49 then feeds the determined impact results to parameters 22, diagnostics 24 and action 26 for purposes of updating the rule base 32. In a preferred embodiment, techniques of U.S. patent application Ser. No. 10/005,481, filed on Oct. 26, 2001 (herein incorporated by reference) are employed to implement this feedback and updating.

Figure 6:
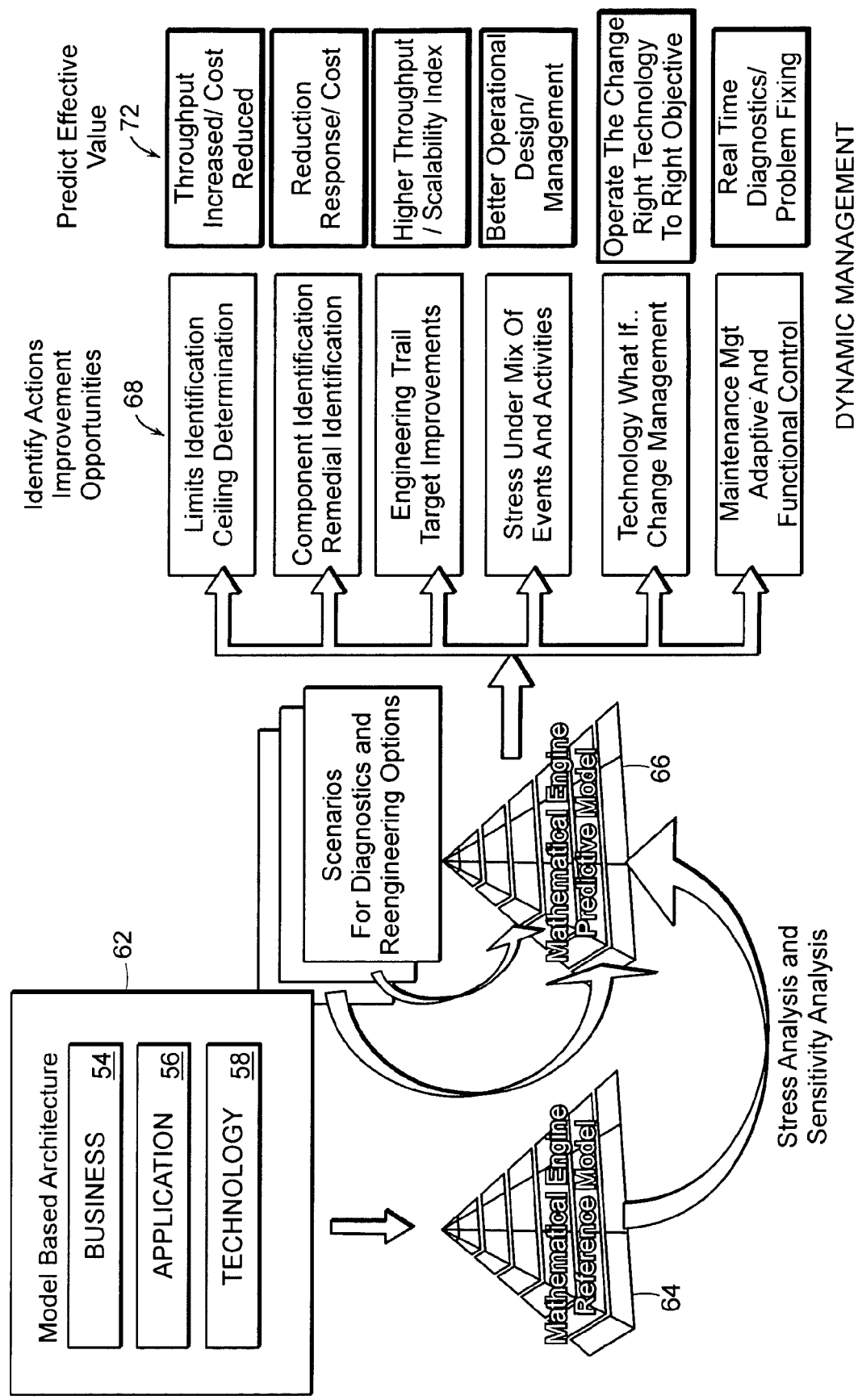
FIG. 6 is a schematic illustration of embodiments of the present invention.

Turning to FIG. 6 and given the above, embodiments of the present invention provide modeling and analysis of existing IS architectures as well as that of future (contemplated, to be designed) IS architectures. The basis of each such modeling is the multi-layer mathematical model 62 having a business layer 54, an application/data layer 56 and a technology layer 58 with the added corporate/enterprise layer 13 on top and multi-protocol label switching (MPLS network) layer 18 as a bottom layer.

The mathematical model 62 produces an initial reference model 64 from which various stress analysis and sensitivity analyses may be made. Various "what-if" scenarios and diagnostics for improvement purposes and the like may be applied to the initial model 64 to produce predictive model(s) 66. Only one such predictive model is shown for simplicity of presentation but it is understood that the present invention may produce many such predictive models 66.

The present invention in turn generates suggested optimizations and/or solutions 39 to improve/fix areas using the business ephemeris 22, 24, 26 and rules engine 38 previously described. Examples of actions identified and indications of improvement opportunities output by the present invention are shown at 68, while the model predicted effect is shown at 72 in FIG. 6.

While this invention has been particularly shown and described with references to preferred embodiments thereof, it will be understood by those skilled in the art that various changes in form and details may be made therein without departing from the scope of the invention encompassed by the appended claims.

In some embodiments, techniques of U.S. application Ser. No. 10/014,317 filed Oct. 26, 2001 (herein incorporated by reference) are employed in calculating business performance metrics in construction module 30.

The present invention modeling of a service oriented architecture and a cost architecture as described above is a quantitative modeling. However, qualitative modeling may be suitable for some embodiments.

Figure 5:
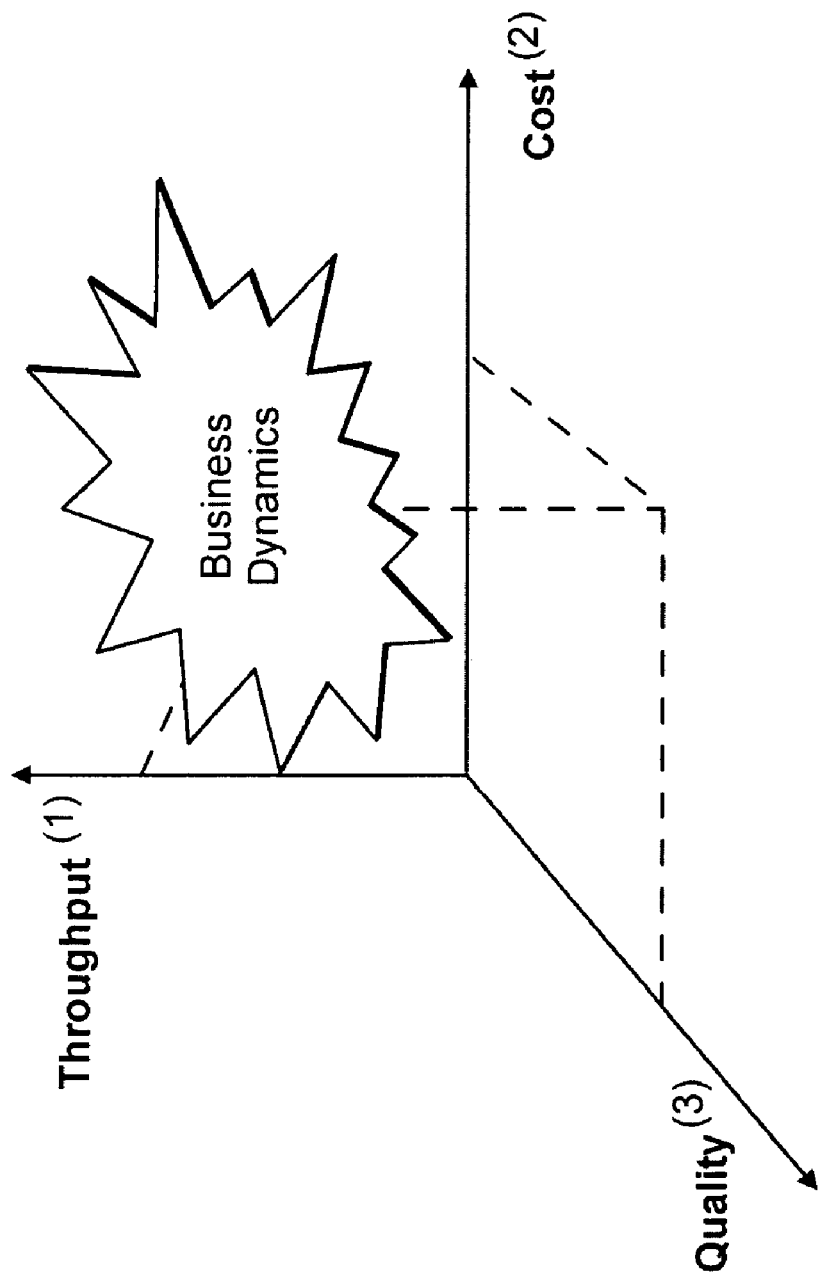
FIG. 5 is a graph illustrating dimensions of quality of service, cost and throughput employed in embodiments of the present invention.

The above described embodiment of FIG. 1 provides real time online diagnostics and problem solving. The modeling of cost, quality of service and throughput on each model layer and the business ephemeris/premodeled situation in remedy table 22, 24, 26 enables impact of any combination of quality (class) of service, cost, throughput or business capacity to be diagnosed. This is graphically illustrated in FIG. 5 where cost is one axis, quality of service is a second axis and throughput a third axis. In one embodiment, along the cost axis is provided a vector of resource and support consumption for a business event (particular and/or global). Along the quality of service axis required response (or time window) to deliver the business event is measured. The number of delivered business events per second is measured along the throughput axis.

Similarly cost-based pricing is enabled by the present invention.

Further, latency may be used as a measure of throughput in the foregoing.

FIG. 7 is a diagram of the internal structure of a computer (e.g., client processor/device 50 or server computers 60). Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network. Memory 90 provides volatile storage for computer software instructions 92 and data 94 used to implement an embodiment of the present invention (e.g., multilayered mathematical model 12 and monitor 42, interpreter 44, rules engine 38 and supporting code 32, 34, 36, business ephemeris 22, 24, 26 and other features code detailed above in FIGS. 1-4). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

What is claimed is:

1. A computer implemented method for modeling information system architecture of an enterprise, comprising:

obtaining a business process design, the business process design describing a plurality of business processes and defining a set of corporate requirements and business service requirements for each business process;

constructing a multi-layer mathematical model of architecture of an information system of the enterprise, the information system architecture supporting the business process design, layers of the multi-layer model comprising a business layer, an application layer, and a technology layer;

modeling performance metrics for each layer of the multi-layer model of the information system architecture, said modeling including dimensions of cost, quality of service and throughput;

from said modeled performance metrics, producing a business ephemeris having a predetermined lookup table cross referencing state of the enterprise information system architecture to remedy, the state being a plurality of data points associated with the mathematical model at a given time, the data points including quality of service, cost and throughput, the remedy being a suggested modification to the information system architecture responsive to the associated state; and monitoring performance of the information system architecture for on-line and off-line analysis of operations of the information system architecture against the business ephemeris.

2. The method of claim 1, further comprising:

comparing the modeled performance metrics with the set of corporate requirements and business service requirements for each business process, said comparing producing respective indications of unacceptable performance metrics of one or more business processes that do not satisfy the set of corporate requirements and business service requirements defined for them based on the produced indications;

determining modifications to the system architecture based on a selected state and associated remedy of the business ephemeris, the selected state having at least one data point corresponding to the unacceptable performance metrics;

proposing the modifications to the information system architecture;

modeling updated performance metrics for each layer of the model of the information system architecture with the proposed modifications;

comparing the updated performance metrics with the set of corporate requirements and business service requirements for each business process; and outputting a description of the system architecture if the updated performance metrics satisfy the set of corporate requirements and business service requirements.

3. The method of claim 1 wherein said modeling performance metrics and/or producing a business ephemeris includes quantitative modeling of at least one of a service oriented architecture and a cost architecture.

4. The method of claim 1, wherein constructing the multi-layer mathematical model of the system architecture, comprises:

mapping each business process to a business application component model, each application component model being linked to one or more component models in the application and technology layers, which support the application component model.

5. The method of claim 4, wherein any combination of component models supporting a business process may be substituted to improve unacceptable performance metrics of the business process.

6. The method of claim 1 wherein the remedy includes optimizations to the enterprise information system architecture.

7. The method of claim 1 wherein the analysis includes any of cost-based pricing and impact analysis of any combination of cost, quality of service and throughput.

8. The method of claim 1 further comprising the step of analyzing the enterprise information system architecture, said analyzing including any combination of:

cost based pricing, real time diagnostics and impact analysis of any combination of cost, quality of service and throughput.

9. A computer system for modeling information system architecture of an enterprise, comprising:

a computer-readable medium;

a computer processor configured to execute the computer-readable medium;

a business process design module, implemented in the computer-readable medium, for describing a plurality of business processes and defining a set of corporate requirements and business service requirements for each business process;

a construction module responsive to the business process design module, the construction module responsive to the business process design module and constructing a multi-layer mathematical model of an information system architecture of the enterprise, the layers of the multi-layer model comprising a business layer, an application layer, and a technology layer, and the construction module modeling performance metrics for each layer of the multi-layer model including modeling cost, quality of service and throughput; and a situation-remedy table formed based on the modeled performance metrics, the table being a predetermined lookup table cross referencing state of the enterprise information system architecture to remedy, the state being a plurality of data points associated with the mathematical model at a given time, the data points including quality of service, cost and throughput, the remedy being a suggested modification to the system architecture responsive to the associated state, the table enabling analysis of the enterprise information system architecture.

10. A computer system as claimed in claim 9 further comprising:

a comparison module coupled to receive the modeled performance metrics and the business process design, the comparison module comparing the modeled performance metrics with the set of corporate requirements and business service requirements for each business process and determining unacceptable performance metrics of one or more business processes that do not satisfy the set of corporate requirements and business service requirements defined for them;

a rule-based modification engine, the rule-based engine determining modifications to the system architecture in order to improve the unacceptable performance metrics determined by the comparison module, wherein (a) the construction module further models updated performance metrics for each layer of the model of the system architecture with the proposed modifications, and (b) the comparison module further compares the updated performance metrics with the set of business service requirements for each business process; and an output module for outputting a description of the system architecture if the updated performance metrics satisfy the set of business service requirements.

11. The computer system of claim 10, wherein:

the construction module further identifies supporting component models in the application and technology layers that support the one or more business processes having unacceptable performance metrics;

the comparison module further evaluates the performance metrics of the supporting component models in order to identify one or more supporting component models having unacceptable performance metrics; and the rule-based engine further searches a data store for modifications to improve the unacceptable performance metrics of the one or more supporting component models.

12. The computer system of claim 11, wherein the modifications to improve the unacceptable performance metrics of the one or more supporting component models include replacement of the one or more supporting component models with alternate component models.

13. The computer system of claim 9, wherein the construction module maps each business process to an application component model, each application component model being linked to one or more component models in the application and technology layers, which support the application component model.

14. The computer system of claim 9 wherein the table cross references state of the enterprise information system architecture to a remedy wherein remedy includes optimizations or modifications to the enterprise information system architecture.

15. The computer system of claim 9 wherein the situation-remedy table is in terms of cost, quality of service and throughput with respect to each other.

16. The computer system of claim 9 wherein the table enables any combination of online and off-line analysis, including:
cost based pricing, real time diagnostics and impact analysis of any combination of cost, quality of service and throughput.

17. The computer system of claim 9 wherein the multi-layer mathematical model quantitatively models a service architecture and a cost architecture of the enterprise information system.

18. Computer apparatus for modeling enterprise information system architecture, comprising:
a computer-readable medium;
means, implemented in the computer-readable medium, for receiving a business process design, the business process design describing a plurality of business processes and defining a set of business service requirements for each business process;
means for constructing a multi-layer mathematical model of information system architecture supporting the business process design, the layers of the multi-layer model comprising a business layer, an application layer, and a technology layer, each layer having cost, quality of service and throughput dimensions;
means for modeling performance metrics for each layer of the multi-layer model of the information system architecture;
means for comparing the modeled performance metrics against a business ephemeris having a predetermined lookup table cross referencing state of the enterprise information system architecture to remedy, the state being a plurality of data points associated with the mathematical model at a given time, the data points including quality of service, cost and throughput, the remedy being a suggested modification to the information system architecture responsive to the associated state; and
means for modifying the system architecture in a manner improving unacceptable performance metrics of one or more business processes that do not satisfy the set of business service requirements defined for them.

19. Apparatus as claimed in claim 18 wherein the business ephemeris is formed from the modeled performance metrics, the business ephemeris enabling online and off-line analysis of operations of the information system architecture.

20. An article of manufacture, comprising:
a computer-readable medium;
a set of computer operating instructions embodied on the medium for modeling an enterprise information system architecture, including instructions for:
providing a business process design, the business process design describing a plurality of business processes and defining a set of corporate requirements and business requirements for each business process;
constructing a multi-layer mathematical model of an information system architecture supporting the business process design, the layers of the multi-layer model comprising a business layer, an application layer, and a technology layer;
modeling performance metrics for each layer of the multi-layer model of the information system architecture, including cost, quality of service and latency; and
from said modeled performance metrics, producing business ephemeris for analysis of the enterprise information system architecture, the business ephemeris having a predetermined lookup table cross referencing state of the enterprise information system architecture to remedy, the state being a plurality of data points associated with the mathematical model at a given time, the data points including quality of service, cost and throughput, the remedy being a suggested modification to the information system architecture responsive to the associated state.

* * * * *